May 20, 1930.  W. J. CITRON  1,759,391
DEVICE FOR PROJECTING FILMS
Filed March 13, 1926  2 Sheets-Sheet 1
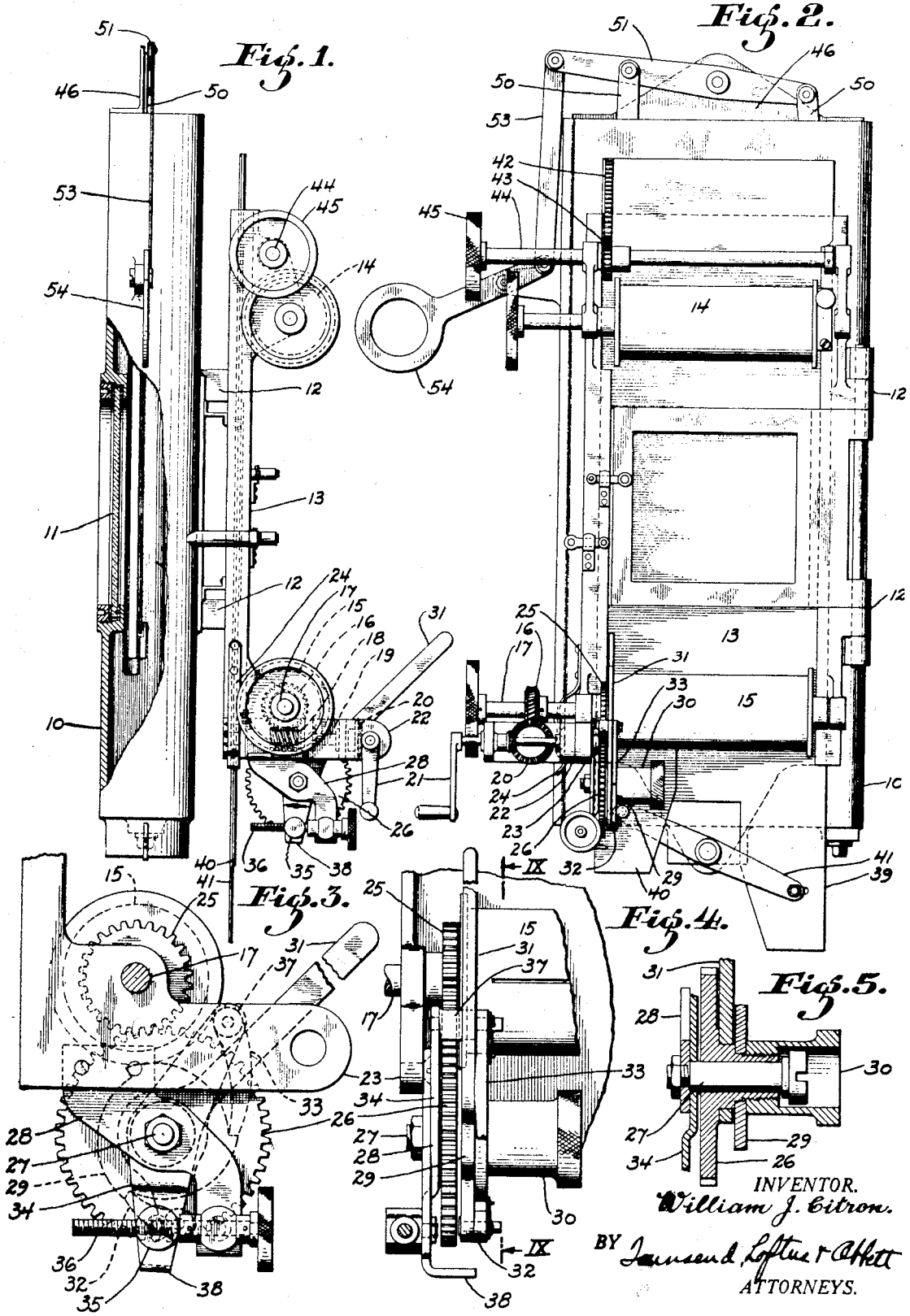
INVENTOR.
William J. Citron.
BY Townsend, Loftus & Affett
ATTORNEYS.

May 20, 1930.  W. J. CITRON  1,759,391
DEVICE FOR PROJECTING FILMS
Filed March 13, 1926   2 Sheets-Sheet 2
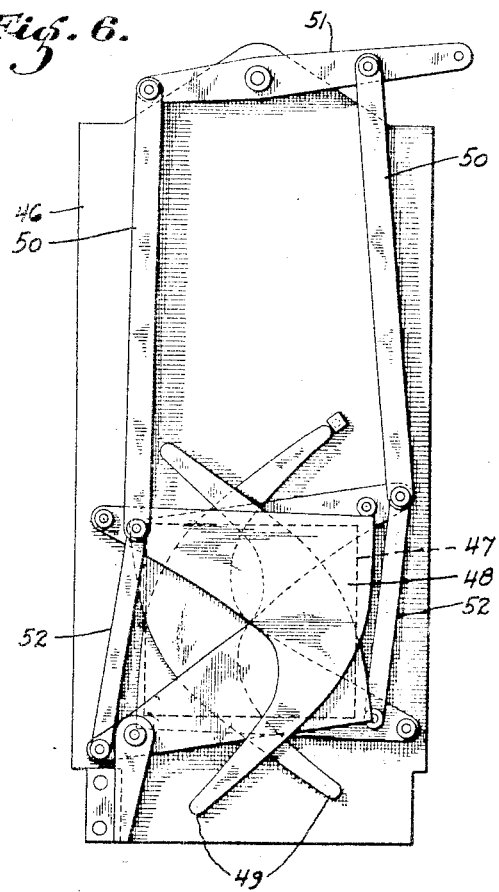
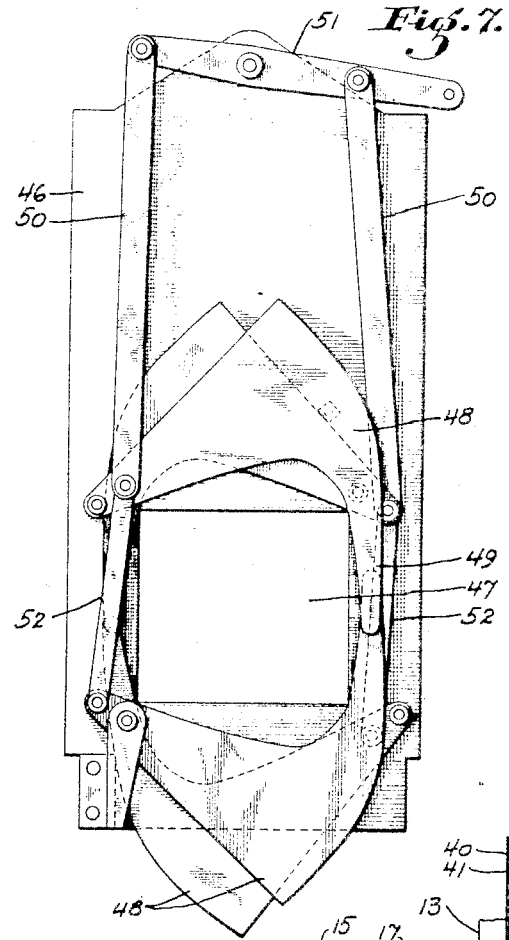
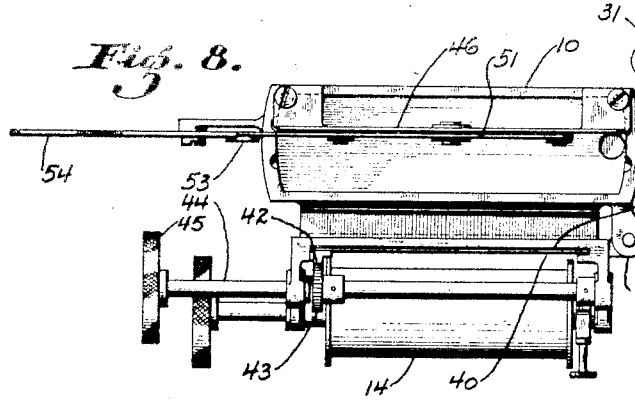
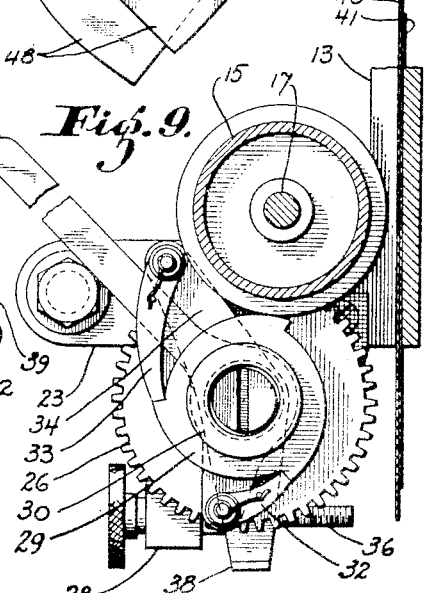
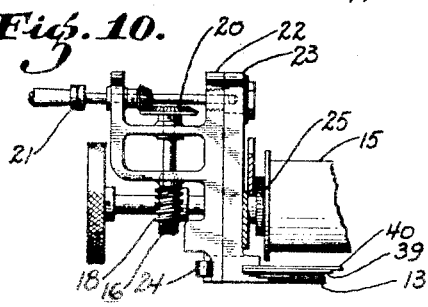
INVENTOR.
William J. Citron.
BY
Townsend Loftus & Ablett
ATTORNEYS.

Patented May 20, 1930

1,759,391

UNITED STATES PATENT OFFICE

WILLIAM J. CITRON, OF SAN FRANCISCO, CALIFORNIA, ASSIGNOR TO THE TRAILOGRAF COMPANY, INC., OF SAN FRANCISCO, CALIFORNIA, A CORPORATION OF CALIFORNIA

DEVICE FOR PROJECTING FILMS

Application filed March 13, 1926. Serial No. 94,589.

This invention relates to devices for feeding films and for controlling the projecting aperture; and is more particularly concerned with an attachment such as disclosed in my Patents Number 1,558,145, issued October 20, 1925; Number 1,600,535, issued September 21, 1926; and Number 1,626,786, issued May 3, 1927.

It is the principal object of the present invention to render the attachment suitable for projecting current topics and anecdotes which require an intermittent feeding of the film so as to quickly shift from one image space to another, and likewise an iris-type of shutter or diaphragm so as to effect a fading in or out of the projected matter and to quickly open or close the projecting aperture. This intermittent feeding mechanism is combined with the slow motion, continuously operating mechanism shown and described in my earlier applications and is embodied with the water cell so as to render the device suitable for use with the present types of lamp houses used with standard motion picture projector machines.

One form which my invention may assume is exemplified in the following description and illustrated in the accompanying drawings, in which—

Fig. 1 shows a side elevation of the attachment with certain parts broken away.

Fig. 2 shows a front elevation of the same.

Fig. 3 shows a detail view in side elevation of the intermittent operating mechanism for the film.

Fig. 4 shows a front elevation of the parts illustrated in Fig. 3.

Fig. 5 shows a detail sectional view of the clutch or friction connection used in the intermittent mechanism.

Figs. 6 and 7 show front views of the iris-type of shutter in different positions.

Fig. 8 shows a plan view of the entire attachment.

Fig. 9 shows a sectional view taken on the line IX, Fig. 4.

Fig. 10 shows a detail view in plan of the mechanism for imparting a slow and continuous movement to the film.

The device is in the nature of an attachment for lamp houses such as are used with a standard motion picture projector and is intended to be mounted upon the lamp house stand in the manner illustrated in my application Serial Number 39,426, above mentioned.

The attachment includes a water cell 10, formed with windows 11. Mounted in front of the water cell on hinges 12 is a frame 13 which forms a guide and support for the film. This frame has a supply reel 14 at its upper portion and a storage reel 15 at its lower portion; the latter being operated, preferably, by hand and with either one of the two mechanisms presently to be described.

One of the said operating mechanisms is intended for use where it is desired to give a slow and continuous motion to the film and comprises a worm gear 16 fixed upon the shaft 17 of the reel 15 and meshing with a screw 18 on a shaft 19. This shaft is driven at slow speed by means of bevel gearing 20 and a crank 21. The said shaft 19 has its bearings upon a plate 22 supported at one end in brackets 23 and held at the inner end by a latch 24 so that it may be swung downwardly to disengage the worm from the worm gear when it is desired to throw the operating mechanism out of commission. By this type of gearing it is possible to get a reduction as between the crank and the reel of fifty to one or greater.

The other operating mechanism is of the intermittent type and is intended to move the film quickly a distance corresponding to one frame or image space upon each actuation. It comprises a gear 25 on the shaft 17 meshing with a gear 26 journaled upon a spindle 27, which spindle is supported in a bracket 28. Mounted upon the hub of the gear 26 is a ratchet wheel 29 adapted to be frictionally locked to the said hub by means of a nut 30 threaded onto the hub. Journaled for free movement on the hub is a lever 31 carrying a pawl 32 for cooperation with the ratchet wheel. The teeth on the ratchet wheel and the stroke of the lever 31 are so proportioned as to impart movement to the film on each actuation equal to one frame or image space. The ratchet wheel is held against reverse motion by a second pawl 33, carried on a cross arm 34 which is mounted on the outer end of the spindle 27. This cross arm is held in adjusted position by means of a swivel 35 on its lower end, through which passes a screw 36 carried by the bracket 28.

The point of starting of the lever 31 is limited by a stop 37, on the upper end of the cross arm 34; and the point of stopping is limited by a lug 38 on the lower end of the bracket 28. By turning the screw 36 the cross arm can be rocked back or forth so as to regulate the point of stopping and starting the intermittent feed so as to get it in position where the film will be properly framed. The intermittent feed can be thrown out of operation by loosening the nut 30.

For use primarily with the continuous feed, I provide oppositely moving shutters 39 and 40 similar to what is disclosed in my prior applications. These shutter plates are connected at their lower ends to a rock arm 41 which is fulcrumed at its middle on the frame 13 so as to impart opposite movements to the said plates. The upper plate is provided with a toothed rack 42 meshing with a gear 43 on a shaft 44. This shaft 44 carries a knob or disk 45, by means of which the operator with one hand may turn it to open or close the shutters.

For use primarily with the intermittent style of feed I provide an iris type of shutter or diaphragm, as shown particularly in Figs. 6 and 7, comprising a plate 46 adapted to be suspended within the water cell and having an opening 47 to register with the windows in the cell. Around this opening are four pivotally mounted gates 48; each one pivoted at one of the corners of the opening. These gates are of a peculiar outline and embody a triangular portion having a stem 49 projecting from one corner opposite to the pivoted portion.

Connected to each of the two upper gates, adjacent to their pivoted ends, are links 50 extending up to a rock arm 51 which is pivoted to the upper end of the plate 46. Each upper gate is connected to the lower gate on the same side by means of a link 52. The connections are such that when the arm 51 is in the position shown in Fig. 6 the gates will be closed; and when the said arm is moved to the position shown in Fig. 7 the gates will be open. The arm 51 is connected at one end to a link 53 which extends outside of the water cell and connects to an operating lever 54 adjacent to the operating shaft 44.

The action of the iris-type of shutter or diaphragm can be varied to give different effects. Generally this shutter mechanism will be closed when the film is being shifted from one frame to another and thereafter the shutter can be opened as quickly as desired to full size or can be slowly opened to give the effect of a fade-in. The controls for both types of shutter mechanism are arranged on the same side of the attachment near the upper end so that the operator will have easy access thereto and can operate either type of shutter mechanism with one hand. The operating mechanisms for the film are both arranged on the same side of the attachment near the lower end so that the operator has complete control over the same with his other hand. The changes from one type of feed or shutter mechanism to the other can, therefore, be made quickly and without interrupting the projection of the film.

Various changes in the construction and arrangement of the several parts herein shown and described may be made without departing from the spirit of my invention as disclosed in the appended claims.

Having thus described my invention, what I claim and desire to secure by Letters Patent is—

1. In a film projecting apparatus, a relatively long, narrow frame to support and guide a film and at its upper and lower ends fitted with supply and storage reels respectively, and operating mechanism for the storage reel including intermittent means to advance the film one or more image spaces upon each actuation, and other means, including speed reduction mechanism, for imparting a continuous movement to said storage reel at a sufficient reduction in speed to permit reading of text on the film while the latter is in continuous motion and a mounting for said operating mechanism adjacent one end of the storage reel, including means whereby the continuous movement device may be readily disconnected from the storage reel so as to prevent interference with the operation of the intermittent means.

2. In a film projecting apparatus, a relatively long, narrow frame to support and guide a film and at its upper and lower ends fitted with supply and storage reels respectively, and operating mechanism for the storage reel including manually operated means having an intermittent movement capable of advancing the film one or more image spaces upon each actuation, and other means, including speed reduction mechanism, for imparting a continuous movement to said storage reel at a sufficient reduction in speed to permit reading of text on the film while the latter is in continuous motion and a mounting for said operating mechanism adjacent one end of the storage reel, including means whereby the continuous movement device may be readily disconnected from the storage reel so as to prevent interference with the operation of the intermittent means.

3. In a film projecting apparatus, a relatively long, narrow frame to support and guide a film, supply and storage reels fitted to the upper and lower ends of said frame, respectively, and operating mechanism for the storage reel including a pawl and ratchet mechanism, and a manually operated lever arranged adjacent the storage reel and ratchet device for actuating the pawl so as to advance the ratchet device a distance corresponding to one or more image spaces on the film at each actuation, and other means, including speed reduction mechanism, for imparting a continuous movement to said storage reel at a sufficient reduction in speed to permit reading of text on the film while the latter is in continuous motion and a mounting for said operating mechanism adjacent one end of the storage reel, including means whereby the continuous movement device may be readily disconnected from the storage reel so as to prevent interference with the operation of the pawl and ratchet mechanism.

4. In a film projecting apparatus, a relatively long, narrow frame to support and guide a film, supply and storage reels supported respectively from the upper and lower ends of said frame and from the same side thereof and operating mechanism for the storage reel including a pawl and ratchet mechanism, a manually operated lever for actuating the pawl so as to advance the ratchet device a distance corresponding to one or more image spaces on the film at each actuation, and means for advancing or retarding the arc of movement of the pawl whereby to permit proper framing of the film and other means, including speed reduction mechanism, for imparting a continuous movement to said storage reel at a sufficient reduction in speed to permit reading of text on the film while the latter is in continuous motion and a mounting for said operating mechanism adjacent one end of the storage reel, including means whereby the continuous movement device may be readily disconnected from the storage reel so as to prevent interference with the operation of the pawl and ratchet mechanism.

5. In a film projecting apparatus, a frame to support and guide a film and fitted with supply and storage reels, operating mechanism for the storage reel including intermittent means to advance the film one image space at each actuation and other means for advancing the film continuously and at slow speed, and shutter mechanism for controlling the projecting aperture including swinging plates forming an iris-type of shutter, and a pair of slidable plates vertically disposed and moving in opposite directions to vary the height of the aperture and a mounting for said operating mechanism adjacent one end of the storage reel, including means whereby the continuous movement device may be readily disconnected from the storage reel so as to prevent interference with the operation of the intermittent means.

6. A film projecting attachment for lamp houses comprising a water cell formed with windows, a frame for supporting and guiding a film carried by the water cell, supply and storage reels on the frame and alternative mechanism for moving the storage reel including continuously operating means adapted to move the film slowly and continuously, and intermittent mechanism to move the film one image space upon each actuation and a mounting for said operating mechanism adjacent one end of the storage reel, including means whereby the continuous movement device may be readily disconnected from the storage reel so as to prevent interference with the operation of the intermittent means.

7. A film projecting attachment for lamp houses comprising a water cell formed with windows, a frame for supporting and guiding a film carried by the water cell, supply and storage reels on the frame, alternative mechanism for moving the storage reel including continuously operating means adapted to move the film slowly and continuously, intermittent mechanism to move the film one image space upon each actuation, an alternative shutter mechanism to control the projecting aperture comprising swinging plates forming an iris-type shutter, and a pair of oppositely moving sliding plates to vary the height of the aperture and a mounting for said operating mechanism adjacent one end of the storage reel, including means whereby the continuous movement device may be readily disconnected from the storage reel so as to prevent interference with the operation of the intermittent means.

8. In a film projecting apparatus, a frame to support and guide a film and fitted with supply and storage reels supported from the frame, operating mechanism supported from said frame to operate the storage reel intermittently to advance the film one or more image spaces at each actuation, said operating means including a lever and adjustable means for limiting the throw of the lever including a rockable cross arm, and means for rocking said arm so as to regulate the point of stopping and starting the intermittent feed.

9. In a film projecting apparatus, a frame to support and guide a film and fitted with supply and storage reels supported from the frame, operating mechanism supported from said frame to operate the storage reel intermittently to advance the film one or more image spaces at each actuation, said operating means including a lever and adjustable means for limiting the throw of the lever including a rockable cross arm, means for rocking said arm so as to regulate the point of stopping and starting the intermittent feed, and alternative means for advancing the film continuously at slow speed and a mounting for said operating mechanism adjacent one end of the storage reel, including means whereby the continuous movement device may be readily disconnected from the storage reel so as to prevent interference with the operation of the intermittent means.

WILLIAM J. CITRON.